Figure 1:
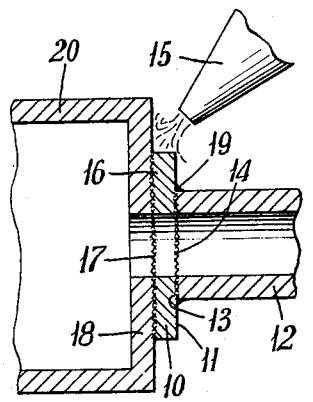

INVENTOR
RANSOM P. SKINNER

United States Patent Office 3,119,632
Patented Jan. 28, 1964

3,119,632
JOINING DISSIMILAR METAL MEMBERS
Ransom P. Skinner, Indianapolis, Ind., assignor to Union Carbide Corporation, a corporation of New York
Filed Feb. 23, 1960, Ser. No. 10,229
8 Claims. (Cl. 285—173)

This invention relates to a process for joining dissimilar metal members, and more particularly to a process for making butt joints using an intermedate silver-containing metal member between an aluminum member and a second metallic member, such as stainless steel.

Aluminum is often desirable as a construction material because of its properties of light weight, high thermal conductivity, and low electrical resistance. In many of its applications, however, undesirable results are obtained when joints must be made between aluminum and other metals. Such connections, for example, are required in the refrigeration industry when aluminum evaporator coils are joined to steel vessels. They are also required in oxygen supply systems for high altitude breathing, when a double walled aluminum liquid oxygen storage container may have stainless steel tubing communicating between the inner and outer vessels. In these two applications the dissimilar metal joint must be vacuum-tight and must retain its strength at low temperatures. Joints between aluminum and stainless steel or iron made by the prior art methods are unsatisfactory because of frequent failure caused by embrittlement of the aluminum-iron intermetallic compounds.

Many solutions to the dissimilar joint problem have been suggested. One proposed solution consists of placing an aluminum coating of controlled thickness on the steel article and then casting or brazing the aluminum article to the aluminum coating. This method provides joints which may be useful at temperatures below about 600° F. and under relatively low flexing conditions. However such joints fail under more rigorous conditions due to the presence of the brittle aluminum-iron alloy at the joint interface.

Another proposed solution to the joint embrittlement problem utilizes a silver intermediate layer. In this method, the steel is plated with a desired thickness of silver. The aluminum is then placed in contact with the silver plating and the joint is formed by electrical resistance welding combined with high pressure. A portion of the silver diffuses into and alloys with the aluminum to provide a strong aluminum-silver-iron bond without formation of a brittle aluminum-iron alloy. However, in this process, another serious problem exists. It is extremely difficult in a resistance welding system to arrive at an ideal joining temperature for all the metals, since aluminum, silver and the other joint materials all have different melting points. For example, aluminum has a relatively low melting point (about 1200° F.) compared to stainless steel (above 1900° F.) and silver (about 1760° F.). The resistance welding is also limited in application to parts wherein large concentrated pressures can be applied and backed up. It is impractical to use such a resistance welding process for joining slender, thin-walled tubes because they cannot withstand the required high pressures nor can back-up electrodes be inserted inside such tubes.

A further attempt at the production of aluminum-dissimilar metal joints referred specifically to aluminum-copper joints wherein the copper was "tinned" with a silver solder prior to aluminum brazing it to aluminum. These "tinned" coats were probably of the order of 0.0005 inch thick and were used only to improve the wetting action during brazing by protecting the copper from oxidation. The resulting product had low peel strength and was relatively brittle due to the complete and early solution of the silver into the aluminum with subsequent formation of brittle aluminum-copper alloys.

Recent developments in this art have overcome many of the shortcomings and disadvantages of the prior art processes. However, there remains unsolved the problem of fabricating a joint between dissimilar metal members when it is inconvenient or impossible to form a lap-type joint of adequate area, as for example, when joining stainless steel tubes to thin-walled aluminum vessels.

In the fabrication of double-walled vacuum-insulated vessels, stainless steel tubes are often connected from the outer aluminum shell to the inner aluminum vessel. Since the insulation space between the aluminum walls is often intended to be less than ½–1 inch, it is desirable that the length of stainless steel tube required for dissimilar joint formation be minimized. Prior art welding or brazing processes required an undesirable amount of tubing length for dissimilar metal lap joint formation. The present process and novel butt joint produced thereby are particularly useful in that they require at most a portion of the stainless steel tube equal to the thickness of the silver member plus the accompanying joint fillet.

The process according to the invention described hereinafter makes it possible for the first time to join aluminum vessels to dissimilar metal tubes by providing a method wherein brazing alloy or soft solder butt joints are made between the dissimilar metal tube and a silver-containing metallic member and brazing alloy butt joints are made between the silver-containing metallic member and the aluminum vessel.

Accordingly, it is an object of this invention to provide a process for joining dissimilar metal members when it is impossible or inconvenient to form a lap-type joint of adequate area therebetween.

It is another object of the present invention to provide a process for joining a first aluminum metallic member and a second metallic member such as stainless steel, to provide a vacuum-tight joint and avoid the formation of brittle aluminum-iron compounds in such joint which cause failure therein.

Another object is to provide a process for joining stainless steel tubes to aluminum vessels without requiring application of high pressure or back-up electrodes.

A still further object is to provide a composite butt-joint assembly of aluminum and stainless steel with a non-brittle vacuum-tight joint capable of withstanding all expected stresses.

Figure 2:
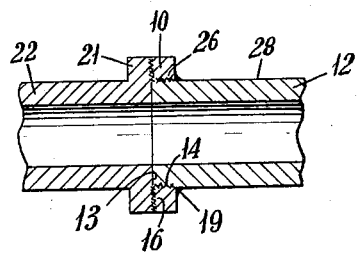
Figure 3:
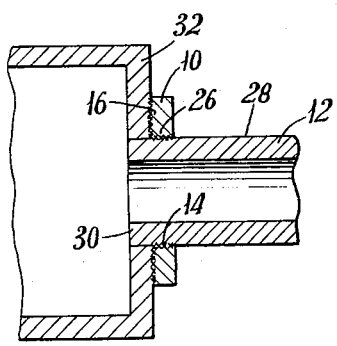
Figure 4:
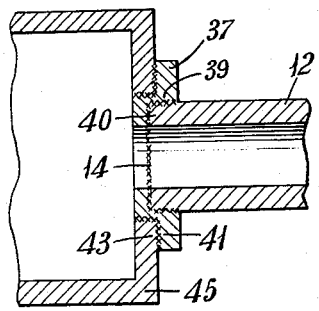

In the drawings:

FIGURE 1 is a cross-section of a joint made according to the process of the invention; and FIGURES 2, 3 and 4 illustrate modifications of the basic butt-type joint of FIGURE 1.

According to the present invention a process is provided for metal bonding a first aluminum or aluminum alloy metallic member such as an aluminum vessel to a second metallic member such as a stainless steel tube. A silver or silver alloy metallic member is placed with one surface in abutting relation with the stainless steel member. Then filler material taken from the class consisting of silver brazing alloys and silver solders is provided along the interface formed by the corresponding surfaces and heat is applied to effect a metal bond therebetween. Next the silver member is placed with another surface in abutting relation to the aluminum member and an aluminum brazing alloy and heat is provided to effect a metal bonded butt-joint between the corresponding abutting surfaces.

In a preferred embodiment of the invention the silver member is a thin circular disc having a minimum thickness of about 0.025 inch.

Referring now to the drawings and specifically to FIG-

URE 1, an apertured silver disc 10 is placed with one surface 11 in abutting relation to the end 13 of a stainless steel tube 12. The interior of tube 12 is aligned with the aperture in silver disc 10. A silver brazed or silver soldered joint 14 is then made along the interface formed between the corresponding abutting surfaces. It is preferred that sufficient joint filler material be used to provide a fillet 19 along the outer periphery of the joint. Such fillet adds to joint strength. Next, another surface 16 of the silver disc 10 is placed in aligned, abutting relation with the wall 18 surrounding the circular opening in the aluminum vessel 20. Then a metal bonded joint 17 using aluminum brazing alloy is made along the interface formed by the corresponding abutting surfaces of the silver disc 10 and the aluminum vessel 20.

The aluminum-silver metal bonded joint 17 can be obtained in several ways. One method is to employ an oxyfuel flame torch as a heat source. When such a torch is used, the preferred method is to apply brazing flux to the entire surface 16 of the silver disc 10. The silver disc 10 is then heated by a torch 15, for example, while brazing alloy material is applied to the periphery of the other surface 16 of the silver disc 10. The resulting molten brazing alloy then flows by capillary action into the space between the silver disc 10 and the aluminum vessel 20. An alternate and preferred method is to position a brazing alloy wafer having substantially the same shape and size as the silver disc or powdered brazing alloy material along with brazing flux between the silver disc 10 and aluminum vessel 20 and then supply heat to melt the brazing alloy in situ.

Still another method of joint fabrication is available using an inert gas-shielded electric arc as the heat source. In such process an arc is maintained between an external electrode and the aluminum vessel 20, such arc being traversed along the periphery 16 of the silver member 10. Aluminum brazing alloy and a minor amount of brazing flux are then fed into the arc zone, preferably by coating an aluminum brazing rod with the brazing flux, to form a metal bond along periphery 16. In such process the metal bonding material is located substantially entirely at the periphery 16 with only a small portion of the bond material residing in the interface region between the silver and aluminum members. This latter process is especially preferred when a concentrated heat source is required to prevent thermal damage to other materials, such as plastics, located in proximity to the joint zone. A flame torch or furnace which may be used for the brazing alloy joint provide less concentrated heat sources.

The process described herein for fabricating aluminum-dissimilar metal joints can be carried out in the manner described above or it can be varied wherein the silver member is joined first to the aluminum member and then to the dissimilar metal member such as stainless steel. The former method is preferred since it requires applying heat at or near the aluminum-silver joint only once and thus avoids the possibility of weakening this joint or preventing it from remaining vacuum-tight.

The particular dimensions of the silver intermediate disc which are necessary for the fabrication of a particular joint will depend primarily on the size of the dissimilar metal tube and on the strength requirements of the joints. In general, the silver disc will have a thickness substantially the same as the wall of the tube. From a theoretical viewpoint the silver disc could be as thin as about 0.002 inch thick and have an outside diameter just slightly larger than that of the dissimilar metal tube. In practice, however, since the silver disc will be heated during joint formation both along the inside diameter and along the outside diameter, it must be thick enough to withstand the heating conditions and also be wide enough to provide proper strength when the dissimilar member is flexed. A preferred minimum thickness is, therefore, about 0.025 inch. Satisfactory joints to aluminum vessels have been produced with stainless steel tubes having outside diameter of about $1/32-1\frac{1}{2}$ inches employing silver discs about 0.050 inch thick and $9/16-2\frac{1}{2}$ inches wide (outside diameter). If a tube as large as about 3 inches outside diameter were used, the silver disc would probably be about 0.1 inch thick and have an outside diameter of about $4\frac{1}{2}$ inches. The disc could have any peripheral shape necessary to suit structural conditions. For example, it may be square, oval, circular, etc. Also the disc need not be flat, as for example when the disc must butt against a curved wall.

Referring now to the modification illustrated in FIG. 2, the improved process of the invention can be employed to fabricate a tubular aluminum-dissimilar metal joint. This figure also illustrates an alternate position for the silver member. In this case an apertured silver disc 10 is placed with one surface 26 in abutting and surrounding relation to the outer surface 28 of stainless steel tube 12. The surface 16 of member 10 and the end 13 of tube 12 are in substantially even alignment. Then the silver disc 10 is silver brazed or silver soldered to the stainless steel tube 12 preferably with a fillet 19 as previously described. The other surface 16 of the disc 10 is brought into abutting relation with an end flange 21 of an aluminum tube 22. Such flange 21 should correspond in size to the silver disc 10. The disc 10 and aluminum flange 21 will then be metal-bonded using brazing alloy filler material in the manner described above.

As shown in FIG. 3, the present process has an advantage from a production line viewpoint in that the joint can be self-centering as well as self-jigging. According to this modification a stainless steel tube 12 is allowed to extend slightly through the apertured silver disc 10. One surface 26 of the silver disc 10 abuts against the outside surface 28 of the stainless steel tube 12 and the silver braze or silver solder joint 14 is made therebetween. The tube extension 30 is then slipped into the appropriate opening in the aluminum vessel 32 so as to position the tube 12 and another surface 16 of the disc 10 for the aluminum-silver metal bonding step outlined above. Such an arrangement also helps to strengthen the overall joint against lateral stresses.

It is convenient from a fabrication and cost standpoint to use the silver member in the form of a flat disc or disc of uniform thickness. However, in another modification of the invention a machined silver member is used.

In this case, as shown in FIG. 4, an apertured silver member 37 has a counterbore forming one surface 39 of the member 37. This surface 39 is brought into abutting relation with the appropriate end 40 of the steel tube 12 and a silver braze or silver solder joint 14 is made along the interface formed by the corresponding abutting surfaces of the silver member 37 and the steel tube 12. Silver member 37 has another counterbore which forms surface 41. This other surface 41 is then brought into abutting relation with the appropriately contoured walls 43 surrounding the opening in the aluminum vessel 45. Finally an aluminum-silver metal bond using aluminum brazing alloy is made along the interface formed between the corresponding abutting surfaces of the silver member 37 and the aluminum vessel 45.

The uniqueness of the invention may be illustrated by the following example describing the formation of the tube to vessel joint.

A silver wafer 0.050 inch thick, $\frac{1}{2}$ inch inside diameter and $1\frac{1}{16}$ inch outside diameter was silver brazed to the end of a $\frac{1}{2}$ inch outside diameter type 304 stainless steel tube. The silver brazing alloy used had a composition by weight of 45% silver, 15% copper, 16% zinc and 24% cadmium. The stainless steel tube was then aligned with a $\frac{1}{2}$ inch diameter opening centrally located in the end of an aluminum vessel $3\frac{1}{2}$ inches outside diameter and having a wall thickness of 0.040 inch. The silver member was placed in close proximity to the aluminum vessel and the silver wafer was aluminum brazed to the vessel using an aluminum brazing alloy containing by weight 11–13% silicon, 0.30% copper, 0.80% iron, 0.20% zinc, 0.10% magnesium, and 0.15% manganese. The resulting overall joint from tube to vessel successfully passed leak and physical deformation tests.

The particular brazing alloys mentioned above are not critical features of the present invention but are specifically mentioned in order to render the example complete. Typical brazing fluxes were also used with each brazing operation. For example, Alcoa No. 33 brazing flux was used in the aluminum-silver joint and Handy Flux, made by the Handy-Harmon Co., was used in the stainless steel-silver joint.

Although the process of the present invention has been described in detail in terms of joining aluminum and stainless steel, it is to be understood that the invention is equally applicable to combinations of aluminum or aluminum alloys with dissimilar metals which can be brazed or soldered to the silver or silver alloy intermediate member. Materials which can be used instead of stainless steel as the second metallic member include ferrous metals, ferrous alloys, nickel, nickel alloys, copper, and copper alloys useful at low temperatures, such as Everdur.

The silver-containing intermediate member is preferably fabricated from substantially pure silver or from silver alloys containing a substantial amount of silver.

I claim:

1. A process for uniting in a strong vacuum-tight joint assembly a first metallic vessel selected from the class consisting of aluminum and aluminum alloys, said vessel having a wall surrounding an opening therein, and a second tubular metallic member selected from the class consisting of ferrous metals, ferrous alloys, nickel, nickel alloys, copper, and copper alloys comprising the steps of placing a third silver-containing metallic member in abutting relation to said second tubular metallic member, providing in proximity to said abutting region filler material taken from the class consisting of silver brazing alloys and silver solders; applying heat along the interface formed by such corresponding abutting surfaces to effect a metal-bonded butt-joint therebetween, placing said third metallic member in abutting relation to the walls surrounding said opening of said first metallic vessel and providing aluminum brazing alloy filler material, brazing flux and heat along the interface formed by such corresponding abutting surfaces to effect a metal-bonded butt-joint therebetween.

2. A process for uniting an aluminum vessel having an opening surrounded by a wall and a stainless steel tubular member comprising the steps of brazing a silver member to said stainless steel tubular member, placing said silver member in close proximity with the walls surrounding said opening in said aluminum vessel and supplying aluminum brazing alloy, flux and heat therebetween to effect a metal bond between said silver member and said aluminum vessel.

3. A process for uniting an aluminum vessel having an opening surrounded by a wall and a stainless steel tube having an outside diameter of up to about 4½ inches with a thickness of up to about 0.1 inch comprising the steps of silver butt-brazing a silver disc to said stainless steel tube, placing said silver disc in close proximity with the walls surrounding said opening in said aluminum vessel and aluminum brazing said disc to said aluminum vessel with an aluminum brazing alloy and flux, along the interface formed between said disc and the wall surrounding said opening.

4. A process according to claim 2 wherein said silver member has a thickness of at least 0.025 inch.

5. A composite butt-joint assembly comprising a metallic vessel selected from the class consisting of aluminum and aluminum alloys, said vessel having a wall surrounding a central opening therein, a metallic tube selected from the class consisting of ferrous metals, ferrous alloys, nickel, nickel alloys, copper, and copper alloys, a third silver-containing metallic member having one surface adapted to abut said metallic tube and another surface adapted to abut said metallic vessel along the wall surrounding said central opening, a brazed joint uniting said third metallic member to said metallic tube along the interface formed by the corresponding abutting surfaces therebetween, a second aluminum brazed joint uniting said third metallic member to said metallic vessel along the corresponding abutting surfaces of said third metallic member and the wall surrounding the central opening in said metallic vessel.

6. A process according to claim 1 wherein an oxy-fuel flame torch is used as the heat source for metal bonding the third metallic member to the first metallic vessel in a butt-joint employing brazing alloy filler material.

7. A process according to claim 1 wherein an inert gas-shielded electric arc is used as the heat source for metal bonding the third metallic member to the first metallic vessel in a butt-joint employing brazing alloy filler material.

8. A process according to claim 1 wherein the aluminum brazing alloy is supplied to the joint interface between the first metallic vessel and third metallic member in the form of an alloy member having substantially the same size and shape as the third metallic member.

References Cited in the file of this patent

UNITED STATES PATENTS

| | | |
|---|---|---|
| 2,137,097 | Staren | Nov. 15, 1938 |
| 2,258,681 | Hoglund | Oct. 14, 1941 |
| 2,271,210 | Scott | Jan. 27, 1942 |
| 2,398,449 | Ronci | Apr. 16, 1946 |
| 2,698,813 | Koh | Jan. 4, 1955 |
| 2,761,047 | Meredith | Aug. 28, 1956 |
| 2,763,822 | Frola et al. | Sept. 18, 1956 |
| 2,790,656 | Cook | Apr. 30, 1957 |
| 2,914,641 | Yuhasz | Nov. 24, 1959 |